July 22, 1952          C. W. PFARR          2,604,555

AUTO HEADLIGHT SWITCHING APPARATUS

Filed June 7, 1950

INVENTOR.
CHARLES W. PFARR

BY Howard J. Whelan
ATTORNEY

Patented July 22, 1952

2,604,555

UNITED STATES PATENT OFFICE 2,604,555

AUTO HEADLIGHT SWITCHING APPARATUS

Charles W. Pfarr, Baltimore, Md.

Application June 7, 1950, Serial No. 166,596

2 Claims. (Cl. 200—11)

This invention relates to switches and more particularly to those of the dim-bright types used for motor vehicles for controlling the head lights.

The electrical head-lights on motor vehicles, when on full, are usually so severe on the eyes of persons coming towards them, as to hurt their eyes and make them partially blind. Recognizing this situation, laws have been passed in most States to the effect that the vehicles have to be equipped with switches that will alternately operate the lights to run on their bright filaments and dim filaments, and the latter to be used when close to an approaching vehicle coming in the opposite direction so as to make it less stressful on the driver thereof. The switch employed for this purpose is operated by the foot of the driver of the vehicle and when pushed places the switch definitely into contact with one circuit, and stays there of itself until it is pushed again and moved to another circuit. This is done by a ratchet mechanism in the switch. However it has been found, under present conditions, that the dim lights should be more frequently in the circuit at night, than the bright-lights. In order to assure the user that the lights will be definitely on the dim-light circuit during such time, the switch that is involved in this invention, is arranged to remain on one circuit, preferably the dim-circuit, when the switch is not held down on the bright circuit. The switch used in this invention eliminates the ratchet mechanism used in the previous type of switch and employs a mechanism that will automatically return the switching mechanism to the side of the switch that controls, for example, the low beam light circuit as soon as the other circuit to the high beam is opened through the raising of the operator's foot from the switch button.

The main object of the invention is to provide a new and improved two-way foot switch for the control of motor vehicle head-lights that will be in circuit on the selected side of the switch normally, and has to be held closed by an external manipulation on the other circuit as long as the latter is wanted, or it will automatically return to the normal circuit position.

Another object of this invention is to provide a head light foot switch for an automatic return to a definite circuit position at all times, unless forcibly held, connected to another closed circuit position, that will be simple in structure, effective in action, and economical to manufacture.

Other objects will become apparent as the invention is more fully described.

For a better understanding of the invention, and the objects thereof, reference is made to the accompanying drawings which illustrate an embodiment of this invention by way of example, while the claims indicate the scope thereof.

Referring to the drawings.

Similar parts throughout the figures are designated by the same reference characters.

Figure 1:
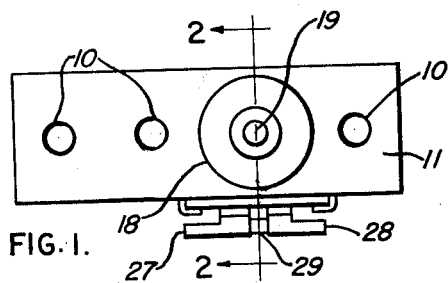
Figure 1 is a plan view of a head light switch embodying this invention.
Figure 2:
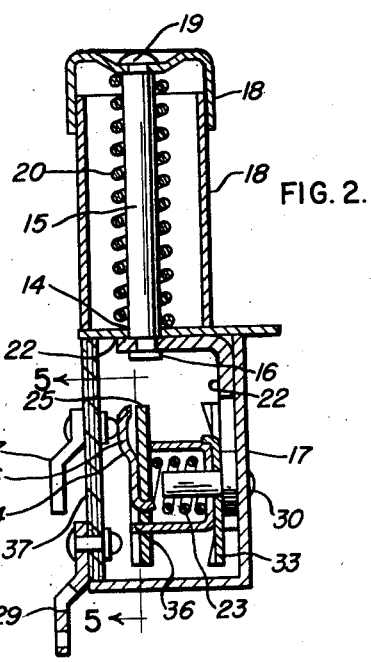
Figure 2 is a sectional elevation on line 2—2 of Figure 1.

The drawings show a foot switch following the conventional form used for head-light control but modified to embody this invention. It consists of a floor board plate 11, flat and thin, and of rectangular outline. It has the conventional holes 10, threaded or otherwise, for the placing of fastening screws therethrough for attaching it to a floor board of a motor vehicle. A cylindrical casing 12 is attached to the upper side of the plate through the use of lugs 13, bent through the plate and swaged over underneath. A hole 14 is provided in the plate, in line with the center line of the casing, for a plunger 15, to reciprocate through. The lower end of the plunger has an enlarged head 16 attached to a sliding bent plate 22 which limits its upward movement by coming into contact with the board plate 11. The plunger 15 is surmounted by a cup-shaped cap 18 slidable for a short travel, on the upper exterior surface of the casing 12. It is held in place by a rivet 19, securing the cap and plunger together. A coil spring 20 encompasses the plunger and normally presses the cap 18 outwardly.

The mechanism of the switch proper, is included in the shell 17, which is attached to the plate 11 in a conventional manner. The mechanism consists of a stamping or frame 21, of bell-like form having projections 36, which support an insulated disc 25 having double-segmental members 24 on its front surface. The members 24 are rotatable with the disc 25 and each segment is bent or formed with a hump 26 to make contact with the circuit binding posts 27, 28, 29 and their connections mounted on insulated wall 37, so as to selectively bridge the line to 29 from either 27 or 28. The members 24 are rigidly mounted on the stamping or frame 21 which rotates in an oscillating manner on the pin 30. A spring 23 tensions the members 24 against the binding posts. The pin 30 is rigidly fastened to the shell 17, and is stationary.

Figure 3:
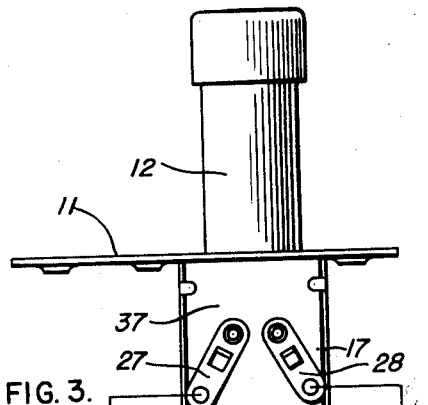
Figure 3 is a front elevation of Figure 1.
Figure 4:
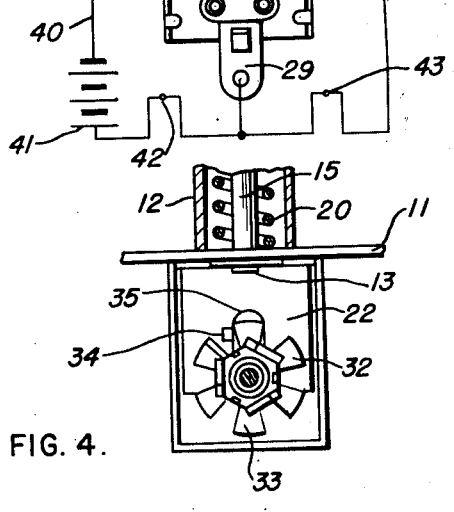
Figure 4 is a detail showing the operating mechanism of the switch in the body thereof.
Figure 5:
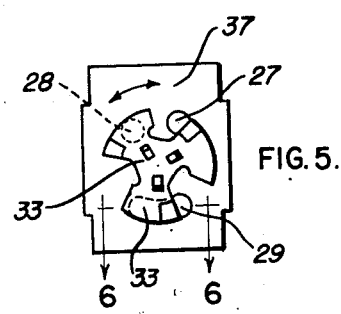
Figure 5 is a detail of the switch blade mechanism, on line 5—5 of Figure 2.
Figure 6:
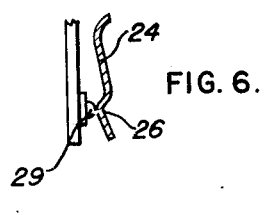
Figure 6 is a sectional detail of the contacts used in this embodiment viewed on line 6—6 of Figure 5.

The stamping 21 is rotated through its arcuate movement by the travel of a rigidly attached vane element 33 having radial blades 32 extending from it. A protuberance 34 is arranged on the face of the sliding plate 22 so that when the latter is propelled downwardly by the plunger 15, it will hit the adjacent blade 32 and rotate the stamping 21 around about 60°. This will carry the members 24 with it so to make secondary contact with the other or second circuit, that the switch controls. A slot 35 is cut into the plate 22 to enable it to move downwardly behind the members 24, without interference from the pin 30. The plunger on being released allows the spring 20 to raise it vertically and move the protuberance 34, so it will rise and rotate the vane element backwardly from its normal position. This will incidentally return the member 24, likewise and contact the first binding post again. Thus as long as the plunger is down, the device will close the secondary circuit at contact 28, but when released will open that circuit and then close the primary one at contact 27. It is not deemed necessary to explain the arrangement of the circuits, but the diagram shown in Figure 3, will make this self explanatory, in this matter. The diagram shows the circuit wires 40, source of power 41, lamp filaments 42, 43, dim and bright, with the connections to the binding posts as indicated.

The manner of attaching the parts together follows conventional practice and need not be further detailed for those skilled in the art.

The plunger 15 is normally operated by the user, by pressing with his foot downwardly on the cap 18, overcoming the resilient resistance of the spring 20 and actuating the switch by moving the sliding plate 22 and segment members as described. This changes the flow of current from one circuit to the other, which in this instance is from dim to bright filaments in the head lights. The plunger however cannot remain down unless the extraneous pressure by the user is continued on it. The removal of his foot causes the plunger to automatically rise and brings the switch around to its contact with the first circuit, and this incidentally energizes the dim circuit. The construction of the device is simple and is compact in form. It leaves the matter to the personal judgement of the user as to when he will use the secondary circuit, but that of the primary circuit is a matter that the switch takes over when pressure is released from the cap 18 by the foot of the operator. Previously it has been necessary for the operator to make a different movement of his foot to the plunger every time he sought to change the head-light lighting, and in many cases made the change wrongly. This is avoided in this invention, and the necessary amount of operations required of the operator are reduced to that required before.

While but one form of the invention is outlined in this application for patent, it is not desired to limit it to such construction as it is appreciated that other structures could be designed and made that would employ the same principles and come within the scope of the appended claims.

Having thus described the invention, what is claimed is:

1. An electric switch unit comprising a power terminal and a pair of distributing terminals, an oscillatable contact member for selectively connecting either distributing terminal with the power terminal, an insulating disc carrying said contact member, a frame having projections extending through said disc, a shell, a pin rigidly secured to said shell and extending through said frame, a spring within the frame, mounted around the pin, said spring having one end abutting the disc, to constantly bias the contact member towards the distributing terminal, a mounting plate for the switch secured to said shell, and means for oscillating said frame on said pin, including a vane-carrying element attached to said frame, a plate slidable in said shell, said plate having an extension engageable with the vanes of the vane-carrying element to oscillate said element when the plate reciprocates in opposite directions.

2. An electric switch unit as set forth in claim 1, further including a reciprocable plunger attached to said plate, and a spring for moving the plunger in one direction.

CHARLES W. PFARR.

REFERENCES CITED

The following references are of record in the file of this patent:

UNITED STATES PATENTS

| Number | Name | Date |
|---|---|---|
| 1,908,205 | Winning | May 9, 1933 |
| 2,213,625 | Cummings | Sept. 3, 1940 |
| 2,231,387 | Jones | Feb. 11, 1941 |
| 2,283,630 | Hill | May 19, 1942 |
| 2,298,781 | Bluemle | Oct. 13, 1942 |